(12) United States Patent
Kemper et al.

(10) Patent No.: US 10,159,179 B2
(45) Date of Patent: Dec. 25, 2018

(54) ROOT CROP HARVESTER WITH ADJUSTABLE PINCH POINT

(71) Applicant: Spudnik Equipment Co., LLC, Blackfoot, ID (US)

(72) Inventors: Rainer Kemper, Idaho Falls, ID (US); Andy Florence, Idaho Falls, ID (US); Hugo Dabbelt, Shelley, ID (US); Rainer Borgmann, Idaho Falls, ID (US)

(73) Assignee: SPUDNIK EQUIPMENT CO., LLC, Blackfoot, ID (US)

( * ) Notice: Subject to any disclaimer, the term of this patent is extended or adjusted under 35 U.S.C. 154(b) by 263 days.

(21) Appl. No.: 15/131,702

(22) Filed: Apr. 18, 2016

(65) Prior Publication Data

US 2017/0295720 A1    Oct. 19, 2017

(51) Int. Cl.
  *A01D 25/04*    (2006.01)
(52) U.S. Cl.
  CPC ................... *A01D 25/04* (2013.01)
(58) Field of Classification Search
  CPC ...... A01D 25/04; A01D 25/005; A01D 33/00; A01D 33/14
  USPC .......... 171/28, 110; 172/549, 488, 576, 483, 172/583, 600
  See application file for complete search history.

(56) References Cited

U.S. PATENT DOCUMENTS

| | | | | |
|---|---|---|---|---|
| 2,603,138 A | * | 7/1952 | Rafferty | A01C 7/205 111/63 |
| 2,972,383 A | * | 2/1961 | Erdman | A01D 25/04 171/133 |
| 3,010,522 A | * | 11/1961 | Oppel | |
| 3,191,686 A | * | 6/1965 | Everett | A01D 17/06 171/58 |
| 3,227,223 A | * | 1/1966 | Parrish | A01D 25/005 171/58 |
| 3,419,084 A | | 12/1968 | Barows et al. | |
| 3,425,494 A | | 2/1969 | Parrish | |
| 3,454,099 A | * | 7/1969 | Wells | A01D 25/04 171/58 |
| 3,468,378 A | * | 9/1969 | Balligand | A01D 25/044 171/58 |
| 4,137,973 A | * | 2/1979 | Schwitters | A01D 25/04 171/58 |
| 4,942,927 A | * | 7/1990 | Halfmann | |

(Continued)

FOREIGN PATENT DOCUMENTS

FR    2677844    12/1992

*Primary Examiner* — Jamie L McGowan
(74) *Attorney, Agent, or Firm* — Parsons Behle & Latimer

(57) ABSTRACT

A root crop harvester apparatus includes a transverse frame, supported to move above ground in a harvesting direction and oriented generally perpendicular to the harvesting direction. A plurality of pairs of generally upright, spaced apart puller wheels are connected to the transverse frame in a trailing orientation, having a substantially common rotational axis, and configured to contact the ground, each pair having a pinch point therebetween. The transverse frame is pivotal about an axis that is substantially aligned with the substantially common rotational axis, whereby rotation of the transverse frame collectively rotates all of the pairs of puller wheels about the common rotational axis and thereby adjusts a location of all of the pinch points with respect to the harvesting direction.

19 Claims, 5 Drawing Sheets

(56) References Cited

U.S. PATENT DOCUMENTS

| | | | |
|---|---|---|---|
| 5,482,120 A | 1/1996 | Lloyd | |
| 5,878,821 A | 3/1999 | Flenker et al. | |
| 5,915,481 A | 6/1999 | Flenker et al. | |
| 6,988,559 B2 * | 1/2006 | Holy | A01D 25/005 171/45 |
| 2012/0095654 A1 * | 4/2012 | Miller | A01D 33/14 701/50 |

* cited by examiner

ROOT CROP HARVESTER WITH ADJUSTABLE PINCH POINT

FIELD OF THE DISCLOSURE

The present application relates to equipment for harvesting root vegetables, such as sugar beets. More particularly, the present application relates to a harvester with pairs of puller wheels in which a longitudinal location of the pinch point between adjacent puller wheels is quickly and easily adjusted for an entire set of puller wheels.

BACKGROUND

The present disclosure relates to devices for pulling and harvesting root crops, such as sugar beets. Sugar beets are one type of root vegetable that is cultivated and harvested in large quantities. Sugar beets and other similar root vegetables can be harvested using a harvester having sets of puller wheels that are attached to a frame that is drawn along the ground behind a tractor, the puller wheels gripping and pulling each sugar beet from the ground. In this type of harvester, each pair of puller wheels are aligned with each row of beets, and the wheels are canted at an angle relative to each other and relative to the direction of motion of the tractor. This angle of the wheels relative to each other and relative to the direction of the pulling vehicle causes the wheels to dig into the ground and rotate as they are drawn along causing the wheels to grip the sugar beets or other root crop at a pinch point (the point of minimum clearance between opposing puller wheels) as the device rolls along. This action of the puller wheels grabs and pulls the root crops out of the ground one-by-one. Paddle wheels can be provided to rotate above and between each pair of puller wheels to knock the beets from between the wheels and place them on an output mechanism, such as a conveyor belt.

It can be desirable to modify the location of the pinch point to ensure that beets reach the conveyor belt or other output mechanism, and are not prematurely released. The pivot point for each puller wheel assembly is located upon the frame being drawn by the tractor. Traditionally, the longitudinal location of the pinch point (i.e. the location of the pinch point relative to the direction of motion of the harvester) can be adjusted by adding spacers to rotate each individual puller wheel assembly down relative to the frame that carries the puller wheels. However, in this approach, each wheel assembly must be individually adjusted and disassembly may be required. Additionally, in this approach, the location of the pinch point relative to the paddle wheel is changed because the position of the paddle wheel is not affected by the spacers.

The present application is directed to one or more of the above issues.

SUMMARY

In accordance with one aspect thereof, the present disclosure provides a root crop harvester apparatus that includes a transverse frame, supported to move above ground in a harvesting direction and oriented generally perpendicular to the harvesting direction. A plurality of pairs of generally upright, spaced apart puller wheels are connected to the transverse frame in a trailing orientation, having a substantially common rotational axis, and configured to contact the ground, each pair having a pinch point therebetween. The transverse frame is pivotal about an axis that is substantially aligned with the substantially common rotational axis, whereby rotation of the transverse frame collectively rotates all of the pairs of puller wheels about the common rotational axis and thereby adjusts a location of all of the pinch points with respect to the harvesting direction.

In accordance with another aspect thereof, the present disclosure provides a sugar beet harvester apparatus that includes a wheeled frame, configured to move on ground in a harvesting direction, with a transverse frame, attached to the wheeled frame and oriented generally perpendicular to the harvesting direction. A plurality of pairs of generally upright, spaced apart, symmetrically non-parallel puller wheels are connected to the transverse frame in a trailing orientation. The plurality of pairs of puller wheels have a substantially common rotational axis, and are configured to contact the ground, each pair having a pinch point therebetween. The transverse frame is pivotally attached to the wheeled frame with a pivot axis that is substantially aligned with the substantially common rotational axis, whereby rotation of the transverse frame collectively rotates all of the pairs of puller wheels about the common rotational axis and thereby adjusts a location of all of the pivot points with respect to the harvesting direction.

In accordance with yet another aspect thereof, the present disclosure provides a sugar beet harvester apparatus that includes a wheeled frame, configured to be pulled on ground by a pulling vehicle in a harvesting direction, and a transverse frame, pivotally attached to the wheeled frame and oriented generally perpendicular to the harvesting direction. A plurality of longitudinal support members extend rearwardly in a trailing orientation from the transverse frame, and a plurality of pairs of generally upright, spaced apart, symmetrically non-parallel puller wheels are attached to a distal end of each of the plurality of longitudinal support members. The puller wheels have a substantially common rotational axis and are configured to contact the ground, each pair having a pinch point therebetween. A paddle wheel assembly is also attached to the transverse frame, and includes a plurality of paddle wheels that are rotatable about a paddle wheel axis that is parallel to the substantially common rotational axis of the puller wheels, each paddle wheel being disposed to rotate between an upper region of a unique pair of adjacent puller wheels and configured to rearwardly dislodge sugar beets from between the adjacent puller wheels. The transverse frame is pivotally attached to the wheeled frame with a pivot axis that is substantially aligned with the substantially common rotational axis, whereby rotation of the transverse frame collectively rotates the paddle wheel assembly and all of the pairs of puller wheels about the common rotational axis, thereby adjusting a location of all of the pinch points with respect to the harvesting direction.

Figure 1:
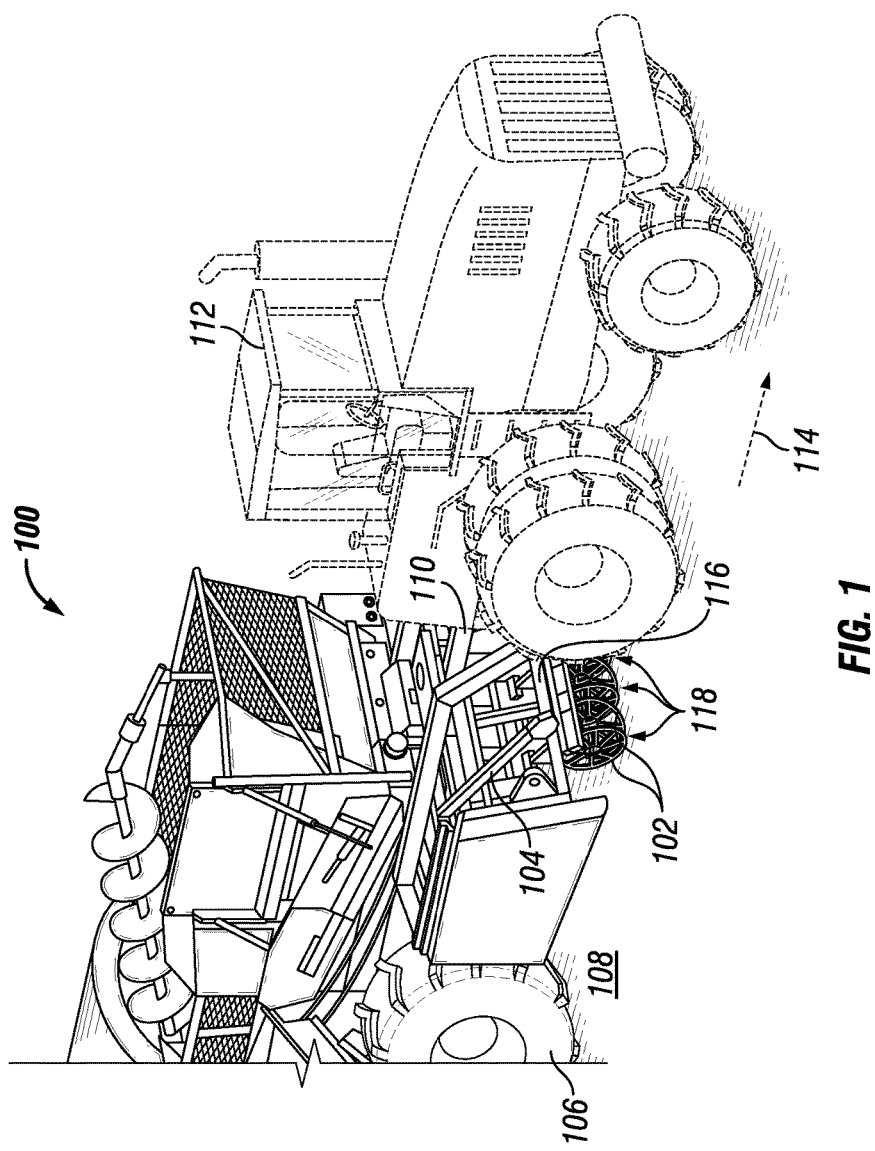
FIG. 1 is a front perspective view of a beet harvester mechanism coupled to a tractor, the beet harvester having a plurality of pairs of puller wheels having a gap adjustment mechanism in accordance with the present disclosure.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

Figure 2:
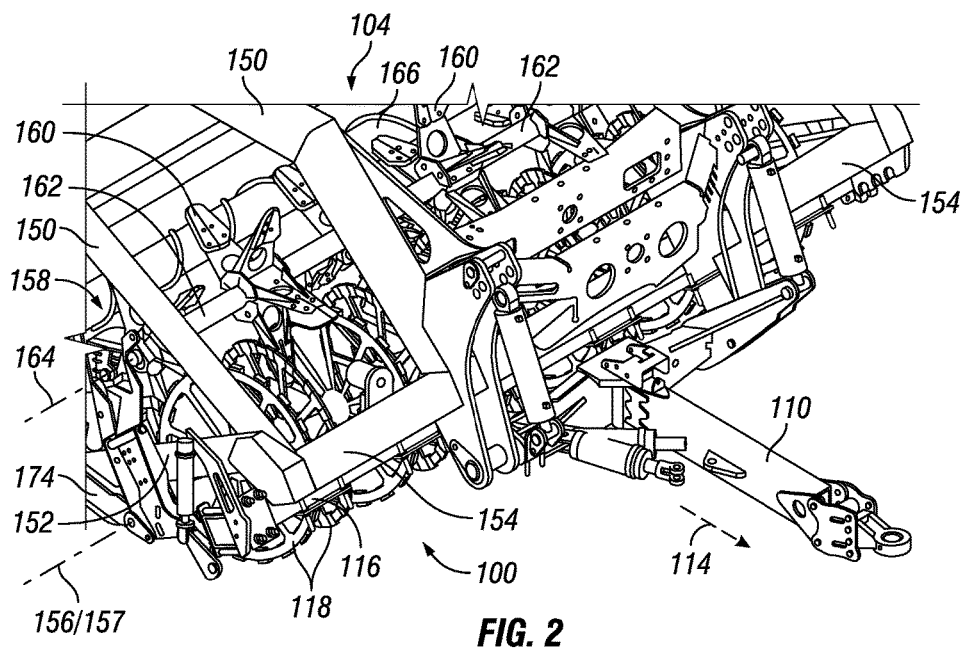
FIG. 2 is a close-up front perspective view of the sugar beet harvester of FIG. 1, showing the array of paired puller wheels attached to the transverse frame of the harvester.

The present disclosure relates to devices for pulling and harvesting root crops, such as sugar beets. An exemplary sugar beet harvester 100 pulled by a tractor 112 is shown in FIG. 1, and a closer perspective view of the lower forward portion of the harvester 100 is shown in FIG. 2. The sugar beet harvester 100 generally includes a wheeled main frame 104, with wheels 106 for supporting it on the ground 108, and a hitch 110 for connecting the harvester 100 to a towing or pulling vehicle 112, such as a tractor, for pulling it in a field in a harvesting direction, indicated by arrow 114. The main frame 104 includes multiple upper longitudinal beams 150, a lower angled support arm 152 at each lateral side of the harvester 100, and a transverse forward beam 154 that extends across the front portion of the harvester 100. These beams and supports 150, 152 and 154 are fixed portions of the harvester main frame 104. Pivotally attached to the main frame 104 is a transverse frame 116, which is oriented generally perpendicular to the harvesting direction 114.

Attached to the transverse frame 116, at row width intervals, are a plurality of longitudinal support members 120 (best seen in FIGS. 3-5) that extend rearwardly in a trailing orientation from the transverse frame 116. Attached to a distal end of each of the plurality of longitudinal support members 120 are a plurality of harvesting wheel units 118, which each comprise a pair of generally upright, spaced apart, symmetrically non-parallel puller wheels 102. The plurality of pairs of puller wheels 102 can include 6 to 12 puller wheel pairs attached at a spacing of about 20" to 30" upon the transverse frame 116, though other quantities of puller wheel sets 118 can be used, and these can be at different spacings. The puller wheels 102 are of a common size and shape (e.g. 34" diameter), and are rotatably disposed on axle assemblies 122 (shown in FIG. 3) that are attached to the transverse member 116 of the frame 104. The puller wheels 102 have a substantially common rotational axis, indicated at 157 in FIG. 5, and are configured to contact the ground 108.

Figure 3:
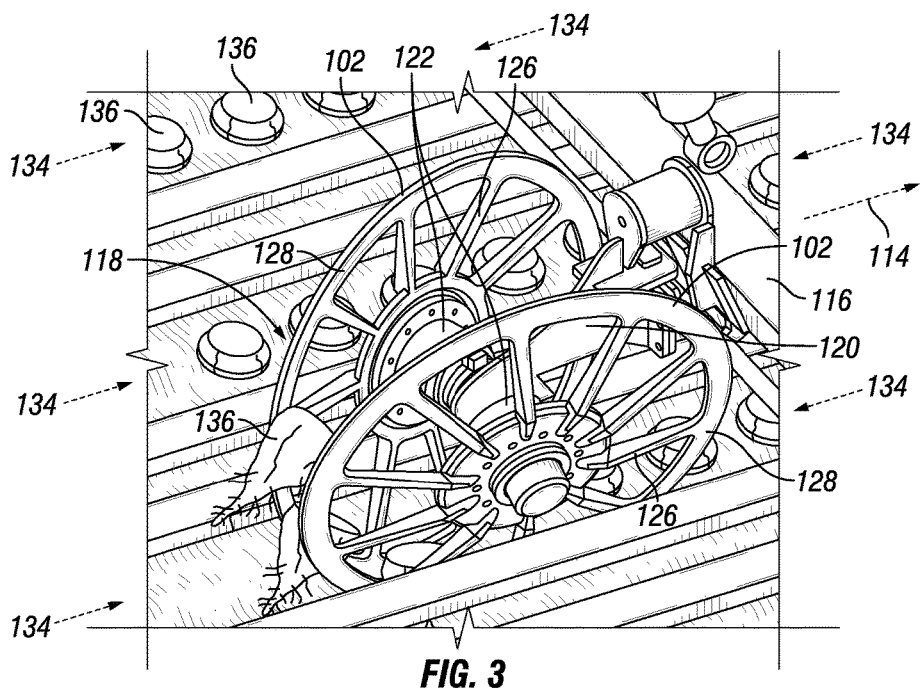
FIG. 3 is a rear perspective view of a pair of puller wheels in operation.
Figure 4:
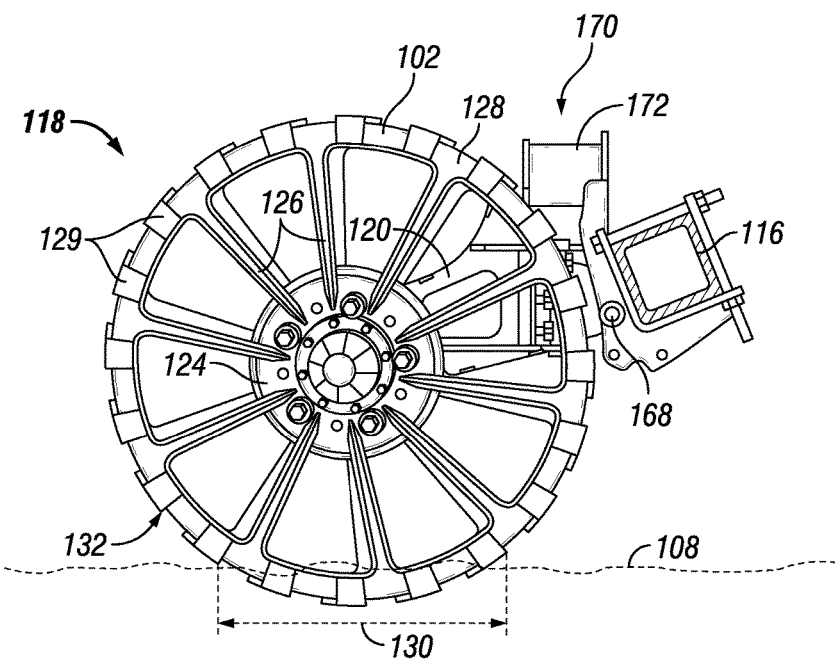
FIG. 4 is a side view of one trailing arm assembly attached to the transverse frame, with its attached puller wheel pair.
Figure 5:
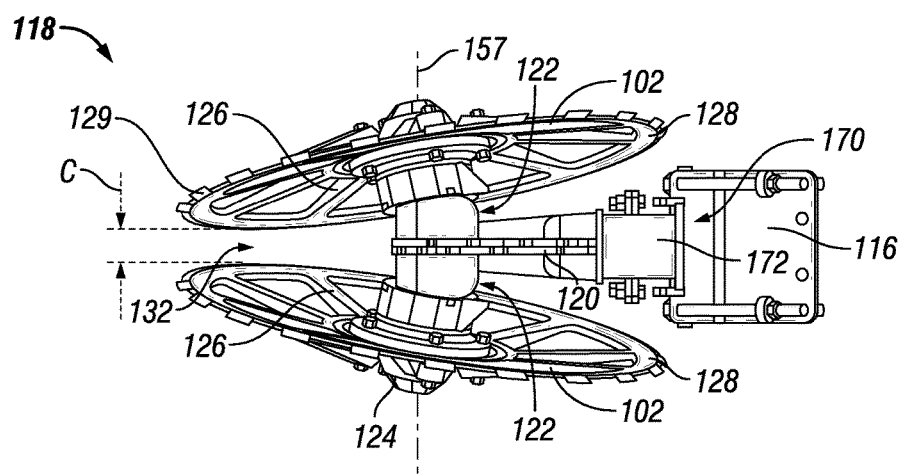
FIG. 5 is a top view of the trailing arm and pair of puller wheels of FIG. 4.

A rear perspective view of an embodiment of a single harvesting wheel unit 118 is shown in FIG. 3. Side and top views of another embodiment of a single harvesting wheel unit are shown in FIGS. 4-5. Each harvesting wheel unit 118 includes a longitudinal support member 120, which is attached to the transverse frame member 116 in a trailing orientation, and a pair of generally oppositely oriented, fixed wheel axle assemblies 122, which are attached to the transverse frame member 116 via a respective longitudinal support member 120, which is generally perpendicular to the transverse frame member 116. Each puller wheel 102 has a central wheel hub 124 and a plurality of spokes 126 that connect the perimeter rim 128 of the wheel 102 to the wheel axle assembly 122. The rim 128 provides a sharpened disk edge for cutting into the ground 108. Each wheel 102 and its rim 128 are positioned to contact and cut into the ground 108 in a cut region 130 (best shown in FIG. 4) as a respective pair of wheels 102 rolls thereover. The rim 128 can be smooth, as shown in FIG. 3, or it can include teeth 129 disposed around its perimeter, as shown in FIGS. 2, 4-8. The teeth 129 provide traction so that the wheel 102 rotates, instead of merely sliding against the ground 108, and can also help the wheel 102 to cut into hard ground in the cut region 130.

The wheel axle assemblies 122 can be downwardly and rearwardly canted or angled, to provide a symmetrically non-parallel orientation of the wheels 102. This angular offset of the wheels is best viewed in FIGS. 3 and 5. As used herein, the term "symmetrically non-parallel" is intended to indicate that the wheels are both rearwardly and downwardly canted in an equal and opposite way. That is, the wheels in each pair are symmetrically canted or angled with respect to each other so that they have a larger gap between them toward the front (i.e. relative to the harvesting direction 114) and top, and a smaller gap toward the bottom and rear of the pair. The symmetry of the gap causes the puller wheels to track in a straight line as they dig into the ground 108 while the harvester 100 is pulled along, so that lateral forces upon the opposing wheels 102 tend to cancel each other out. The downward and rearward offset angles of the puller wheel axles is typically 10° or less, which for purposes of this description is considered substantially parallel. Consequently, the sets 118 of puller wheels 102 are described herein as having a substantially common rotational axis 157, as shown in FIG. 5.

Because of the angular offset of the wheel axle assemblies 122, the wheels 102 are generally upright, but the wheels in each pair have a pinch point 132, or point of minimum gap or minimum clearance C between the wheels in a portion of the cut region 130. As the harvester apparatus 100 is pulled along the ground 108 in alignment with the crop rows 134 (FIGS. 1, 3) of root vegetables 136, the wheels 102 cut into the ground 108 in the cut region 130 on opposing sides of the row 134 of root vegetables 136, and the rotational motion of the wheels 102 causes the rims 128 of the wheels 102 to draw together as they rotate, approaching the pinch point 132. In this motion, the rims 128 of the wheels 102 draw toward each other, grip the vegetable 136 and pull it from the ground as the trailing portions of the opposing wheels 102 rise. As the wheels 102 rotate past the pinch point 132, the trailing portions of the wheel rims 128 will draw away from each other, releasing the withdrawn vegetable 136.

As shown in FIG. 2, a paddle wheel assembly 158 can be positioned generally above and behind the array of puller wheels 118. The paddle wheel assembly 158 includes a plurality of paddle wheels 160 that are affixed to a paddle wheel shaft 162 that is rotatable about a paddle wheel axis 164, which is parallel to the pivot axis 156 of the transverse frame 116 (discussed in more detail below), which is generally aligned with the substantially common rotational axis 157 of the puller wheels. Each paddle wheel 160 is positioned and configured so that its paddles rotate between an upper region of a specific pair of adjacent puller wheels 102, and to rearwardly dislodge sugar beets from between the adjacent puller wheels 102. The paddles thus knock the beets out from between the puller wheels 102 and onto a roller or conveyor 166 or other output device that is positioned behind the puller wheels 102. From that point, the beets are drawn further into the harvester device 100 in a manner that is well known.

As noted above, it can be desirable to modify the location of the pinch point 132 between adjacent puller wheels 102 of a root crop harvester 100. This can be desirable to control how the soil and the root crop (e.g. sugar beet) interact. For example, depending on soil conditions, adjusting the location of the pinch point 132 can affect how much dirt is attached to each beet as it is harvested. By changing the position and angle of the pinch point 132, one can minimize dirt intake into the harvester 100, minimize damage to the beet, and/or minimize waste, (such as leaving beets in the field).

As shown in FIGS. 2-4, in prior harvester devices, adjustment of the location of the pinch point 132 has typically been accomplished by adding spacers to each puller wheel set. Specifically, viewing FIG. 4, the trailing arm 120 of each puller wheel set 118 in a typical root crop harvester is attached to the transverse arm 116 at a lower pivot point 168 and at an upper shock mount 170. The shock mount 170 includes a large resilient (e.g. rubber or rubber-like material) spacer 172, which is connected between the transverse frame 116 and an upper portion of the trailing arm 120. This shock mount 170 allows the trailing arm 120 to flex up and down as the puller wheels 102 are drawn across the ground 108, in order to absorb impacts and deflection caused by contact with rocks, uneven ground, etc.

In prior puller wheel systems, adjustment of the angle of the trailing arm 120, and thus movement of the pinch point 132, involves the installation of shims or spacers (e.g. metal plates or washers) between one end of the resilient spacer 172 and the connected portion of the transverse frame 116 or the trailing arm 120. This causes the effective length of the spacer 172 to increase, thus rotating each individual trailing arm 120 and puller wheel assembly 118 down relative to the transverse frame 116. Unfortunately, in this approach, each wheel assembly 118 must be individually adjusted and disassembly may be involved. Additionally, in this approach, the location of the pinch point 132 relative to an associated paddle wheel can also change if the paddle wheel assembly is not somehow connected to the trailing arm 120 or the transverse frame 116.

Figure 6:
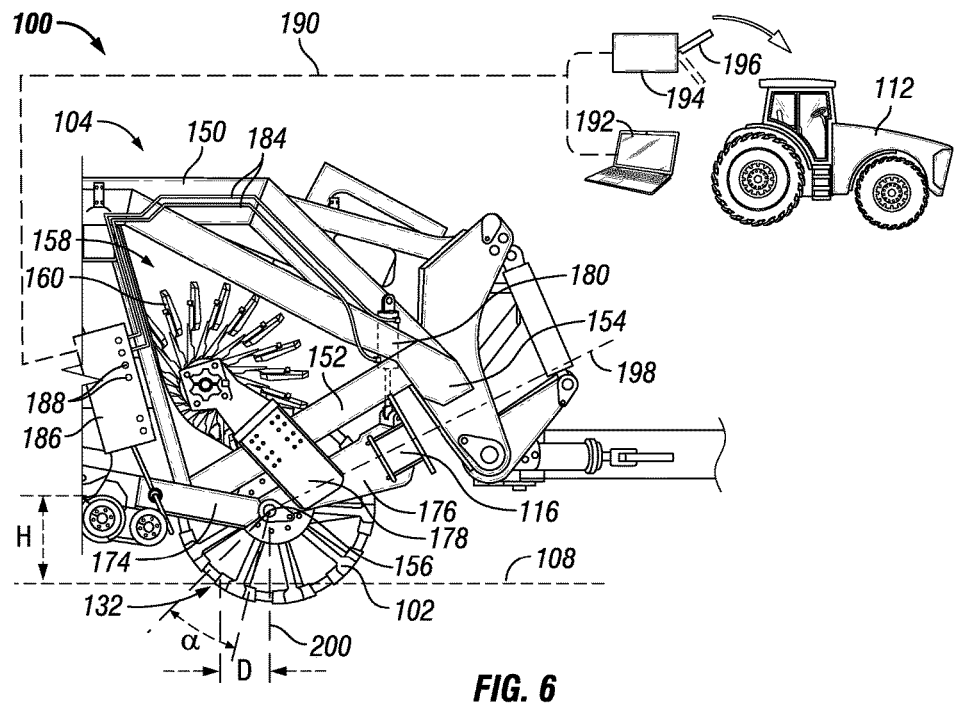
FIG. 6 is a side view of the beet harvester device of FIGS. 1 and 2, showing the transverse frame, the puller wheel array and the paddle wheel assembly, the puller wheel array being pivotal about the approximate axis of rotation of the puller wheels.

Advantageously, the present disclosure provides a root crop harvester in which a location of the pinch point 132 between adjacent puller wheels 102 is quickly and easily adjusted for an entire set of puller wheels. As shown in FIGS. 2 and 6, a puller wheel support beam 174 extends forwardly from a lower portion of the harvester main frame 104 on each lateral side of the harvester 100, to a pivot point that defines the pivoting axis 156 of the transverse frame member 116. A pivoting arm 176 extends upwardly forward from the pivot point 156 and connects to the transverse frame 116. A paddle wheel support arm 178 is fixedly attached to the pivoting arm 176, and extends upward and rearward to support the rotatable axle 162 of the paddle wheel assembly 158. With this configuration, the transverse frame 116 is pivotally attached to the fixed portions of the wheeled main frame 104 with a pivot axis 156 that is substantially aligned with the substantially common rotational axes 157 of the puller wheels.

As used herein, the terms "substantially aligned" and "substantially common rotational axis" are intended to mean that the pivot axis 156 of the transverse frame is within 6" of alignment with the collective rotational axes 157 of the puller wheels 102. As noted above, the puller wheels 102 are mounted upon hubs or axles 122 that are downwardly and rearwardly angled or canted, but for purposes of this discussion are considered substantially parallel. Accordingly, rotation of the transverse frame 116 collectively rotates all of the pairs of puller wheels 102 about the common rotational axis 156, thereby adjusting a location of all of the pinch points 132 with respect to the harvesting direction 114. Because of its fixed connection to the pivoting arm 176, rotation of the transverse frame 116 also rotates the paddle wheel assembly 158, so that the locations of the paddle wheels 160 remain fixed with respect to their respective puller wheel sets 118.

Figure 7:
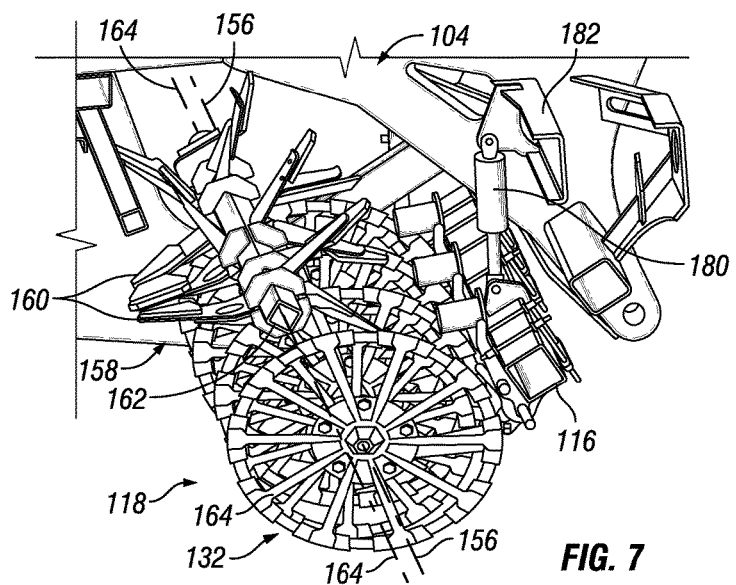
FIG. 7 is a side cross-sectional perspective view of the beet harvester of FIG. 6, showing the hydraulic adjustment mechanism attached to the transverse frame, with the pinch point adjustment mechanism in a neutral position.

As shown in FIG. 6, a mechanism for controllably adjusting the angle of the transverse frame 116 is provided. In the embodiment shown, a hydraulic cylinder 180 (shown in hidden lines in FIG. 6) is attached between the transverse frame 116 and a portion of the main frame 104. Actuation of this hydraulic cylinder 180 allows the transverse frame 116 to be raised or lowered, thus simultaneously pivoting the entire group of puller wheels 102. A side, cross-sectional perspective view of the beet harvester 100 is provided in FIG. 7, showing the hydraulic adjustment mechanism in more detail. Here it can be seen that the hydraulic cylinder 180 is attached to the top of the transverse frame 116, and to a transverse member 182 of the main frame 104. It is to be understood that the pinch point adjustment mechanism can be configured differently than shown herein, and, while the pinch point adjustment mechanism shown in FIGS. 6 and 7 includes a hydraulic cylinder 180, other types of adjustment mechanisms can also be used, such as electrical servo motors, etc.

Referring again to FIG. 6, the hydraulic cylinder 180 can receive hydraulic fluid via hydraulic lines 184 from a hydraulic manifold 186, including a series of hydraulic valves 188, that is associated with the harvester 100. The hydraulic system, including the hydraulic manifold 186 and its valves 188, can be powered in any suitable way, and can be controlled via control signals (e.g. through a control wire 190 or wireless) from a control device, such as a computer controller 192 or an electrical or mechanical controller 194, that can be associated with the tractor 112 or other pulling vehicle (e.g. placed in the cab of the pulling vehicle). The control device can include a control lever 196 or other input device that allows a user to selectively control the angle of adjustment of the transverse frame 116, and therefore control the position of the pinch points 132 of the puller wheel sets 118.

As shown in FIGS. 6-9, the transverse frame 116 that supports all of the puller wheel sets 118 and the paddle wheel assembly 158 pivots as an entire unit about an axis 156 that is substantially aligned with the axes 157 of the puller wheel sets 118. The entire puller wheel assembly is thus pivoted, thereby modifying the locations of the pinch points 132 of every puller wheel at the same time. Because the whole assembly pivots, it is no longer necessary to adjust each puller wheel assembly individually. Since the paddle wheel assembly 158 can move with the transverse frame 116, the paddle wheels 160 are also adjusted simultaneously with the puller wheels 102. Therefore, the position of the paddle wheels 160 relative to the pinch points 132 can remain unchanged. Alternatively, if desired, the paddle wheel assembly 158 can be attached to the main frame 104, so that adjustment of the angle of the transverse frame 116 and the attached trailing arms 120 does not move the paddle wheel assembly 158.

In the image of FIG. 6, the pinch point adjustment mechanism is approximately in a neutral or centered position, as indicated by the axis 198 of the trailing arm 120. The pinch point 132 at this "centered" position sits slightly behind the wheel center 156, as indicated by dashed line 200. The linear distances that the pinch point 132 can travel horizontally and vertically throughout its motion are shown in FIG. 6. In one embodiment, at its centered position, the pinch point 132 can be a distance D of about 9.6" behind the pivot center 156 (indicated by line 200), and a distance H of about 11.2" below the pivot center 156.

The angular pivot range a of adjustment of the pinch point 132 as the whole assembly is pivoted is shown in FIG. 6. This angle α can vary. Overall, it is believed that angles of 20° to 40° (angle from vertical) can be used. In one embodiment, the transverse frame 116 and attached puller wheel sets 118 are pivotal through an arc α of about 20°, though smaller and larger angles can also be used. With respect to the angular range of adjustment, the term "about" as used herein is intended to mean±1°. Within its overall range of angular adjustment, the control system for controlling the pinch point adjustment mechanism can be configured for adjusting the angle α to any point within its range, or it can be configured for adjusting to specific discrete angles, such as increments of 1°.

Several factors apply to the selection of the range of angular adjustment α. If the pinch point 132 is moved too far back and up, the puller wheel opening (i.e. the gap toward the front of the puller wheels) increases too much and tends to cause the harvester to take in too much dirt while not grabbing the beet soon enough. This situation can also negatively affect the release of the beet from between the puller wheels 102. On the other hand, if the pinch point 132 is moved down and forward too far, the puller wheels 102 can tend to pinch the beet too early, and potentially cause damage to it. This configuration can also cause the beet to release from the puller wheels too early, thus not allowing the paddle wheels 160 to properly remove the beet from the wheels.

Figure 8:
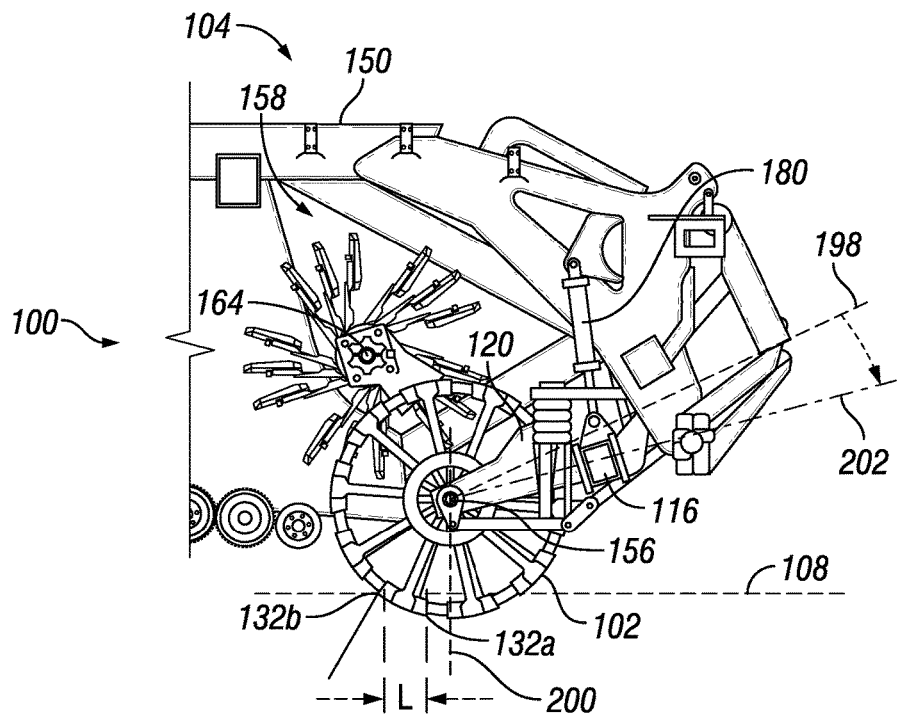
FIG. 8 is a side cross-sectional view of the beet harvester of FIG. 6, showing the transverse frame lowered so that the pinch point is rotated rearwardly.
Figure 9:
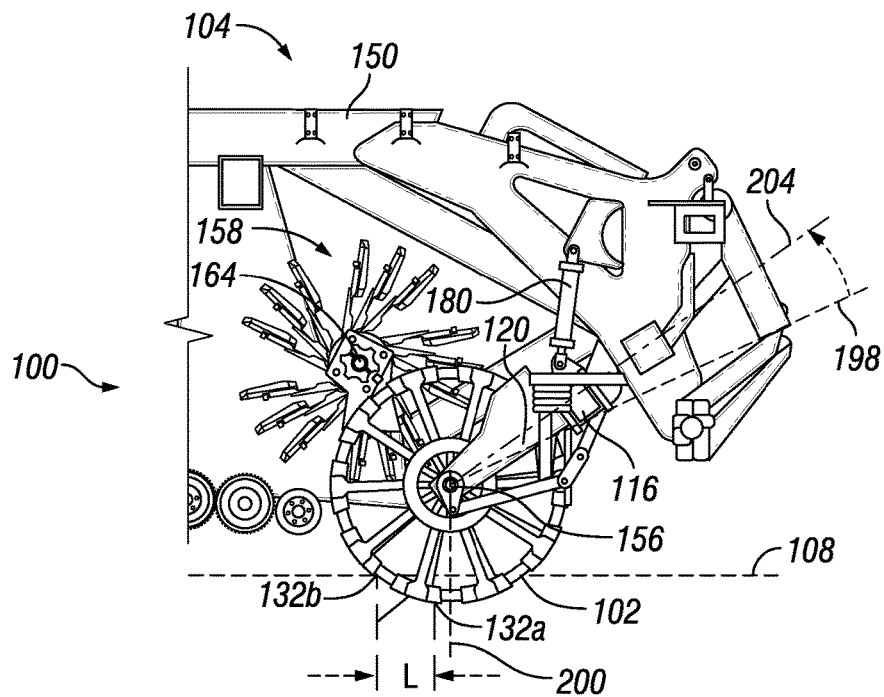
FIG. 9 is a side cross-sectional view of the beet harvester of FIG. 6, showing the transverse frame raised so that the pinch point is rotated forwardly.

With the angular range of adjustment α shown in FIG. 6, the pinch point is adjustable from a forward and downwardmost position, shown at 132*a*, to an upward and rearwardmost position, shown at 132*b*, or any selected point in between. For a 34" puller wheel with a 20° range of adjustment, the pinch point 132 is thus adjustable by more than about 3" horizontally and vertically. With respect to linear measurements, the term "about" as used herein is intended to mean±1". As shown in FIGS. 8 and 9, the pinch point 132 is longitudinally adjustable by a distance L (measured along the ground) of at least about 3" and less than about 6 inches. In one particular embodiment, the distance L is about 3.8". With these dimensions, the pinch point 132 is thus longitudinally adjustable from a point that is less than 8 inches rearward of the centerline 200 of a respective puller wheel, to a point that is more than 11 inches rearward of the centerline 200, and is vertically adjustable from a point that is almost 13 inches below the pivot center, to a point that is less than 10 inches below the pivot center.

Turning to FIGS. 8 and 9, the angular range of adjustment of the transverse frame 116 and the pinch points 132*a,b* are illustrated, as is the linear range of adjustment of the pinch point 132. In these views the puller wheel support beam 174 and pivoting arm 176 are not shown, nor is the lower angled support arm 152 in order to allow a clear view of a single longitudinal support member or trailing arm 120 and its connection to the transverse frame 116. Shown in FIG. 8 is a side cross-sectional view of the beet harvester 100 of FIG. 6, with the transverse frame 116 lowered so that the pinch point 132 is rotated rearwardly to point 132*b*. In this view the hydraulic cylinder 180 is extended, and the downward angular rotation of the transverse frame 116 is indicated at 202 with respect to the axis 198 of the centered position. Alternatively, as shown in FIG. 9 when the hydraulic cylinder 180 is retracted and the transverse frame 116 is raised to its upper extreme, indicated at 204 with respect to the axis 198 of the centered position, the pinch point 132 is rotated forwardly to point 132*a*.

The present disclosure thus provides a root crop harvester apparatus in which a plurality of pairs of puller wheels having a substantially common rotational axis and a pinch point between each pair of wheels are attached to a transverse frame. The transverse frame is pivotally attached to the harvester apparatus with a pivot axis that is substantially aligned with the substantially common rotational axis, whereby rotation of the transverse frame collectively rotates all of the pairs of puller wheels, thereby adjusting a location of all of the pinch points. Thus all of the puller wheels or disks can be adjusted at the same time by pivoting an entire assembly, rather than inserting spacers, as has been done in the past. Adjusting the location of the pinch point can help minimize dirt intake into the harvester, minimize damage to the beet, and/or minimize waste, (such as leaving beets in the field).

Although various embodiments have been shown and described, the present disclosure is not so limited and will be understood to include all such modifications and variations are would be apparent to one skilled in the art.

What is claimed is:

1. A root crop harvester apparatus, comprising:
   a transverse frame, supported to move above ground in a harvesting direction and oriented generally perpendicular to the harvesting direction; and
   a plurality of pairs of generally upright, spaced apart puller wheels, connected to the transverse frame in a trailing orientation, having a substantially common rotational axis, configured to contact the ground, each pair having a pinch point therebetween;
   the transverse frame being pivotal about an axis that is substantially aligned with the substantially common rotational axis, whereby rotation of the transverse frame collectively rotates all of the pairs of puller wheels about the common rotational axis and thereby adjusts a vertical and longitudinal location of all of the pinch points with respect to the harvesting direction.

2. An apparatus in accordance with claim 1, further comprising a pivoting mechanism, configured for rotating the transverse frame to a selected rotated position.

3. An apparatus in accordance with claim 2, further comprising:
   a main frame, associated with the harvester apparatus, the transverse frame being pivotally attached to the main frame; and
   the pivoting mechanism comprising a hydraulic cylinder, connected between the main frame and the transverse frame.

4. An apparatus in accordance with claim 2 further comprising a control device for controlling the pivoting mechanism.

5. An apparatus in accordance with claim 1, wherein the transverse frame and attached puller wheels are pivotal through an arc of about 20 degrees.

6. An apparatus in accordance with claim 1, wherein the pinch point is longitudinally adjustable by a distance of at least 3 inches, measured along the ground.

7. An apparatus in accordance with claim 1, wherein the pinch point is vertically and longitudinally adjustable by at least 3 inches.

8. An apparatus in accordance with claim 1, further comprising:
a paddle wheel assembly, attached to the transverse frame, including a plurality of paddle wheels that are rotatable about a paddle wheel axis that is parallel to the substantially common rotational axis of the puller wheels, each paddle wheel being disposed to rotate between an upper region of a unique pair of puller wheels and configured to rearwardly dislodge root crops from between the adjacent puller wheels, the paddle wheel assembly being attached to move in unison with the transverse frame, whereby a position of a respective paddle wheel relative to the pinch point for each pair of puller wheels remains constant throughout a range of adjustment of the transverse frame.

9. An apparatus in accordance with claim 1, further comprising a longitudinal support member, connected between the transverse frame and each pair of puller wheels.

10. An apparatus in accordance with claim 1, wherein the plurality of pairs of puller wheels comprises 6 to 12 puller wheel pairs attached at a spacing of 20" to 30" upon the transverse frame.

11. A sugar beet harvester apparatus, comprising:
a wheeled frame, configured to move on ground in a harvesting direction;
a transverse frame, attached to the wheeled frame and oriented generally perpendicular to the harvesting direction; and
a plurality of pairs of generally upright, spaced apart, symmetrically non-parallel puller wheels, connected to the transverse frame in a trailing orientation, having a substantially common rotational axis, configured to contact the ground, each pair having a pinch point therebetween;
the transverse frame being pivotally attached to the wheeled frame with a pivot axis that is substantially aligned with the substantially common rotational axis, whereby rotation of the transverse frame collectively rotates all of the pairs of puller wheels about the common rotational axis and thereby adjusts a vertical and longitudinal location of all of the pinch points with respect to the harvesting direction.

12. An apparatus in accordance with claim 11, further comprising:
a hydraulic pivoting mechanism, configured for pivoting the transverse frame to a selected rotated position; and
a control device, configured for controlling the pivoting mechanism.

13. An apparatus in accordance with claim 11, wherein the transverse frame and the pinch point are angularly adjustable through an arc of about 20 degrees, and the pinch point is longitudinally adjustable by a distance of at least 3 inches, measured along the ground.

14. An apparatus in accordance with claim 11, further comprising:
a paddle wheel assembly, attached to the transverse frame, including a plurality of paddle wheels that are rotatable about a paddle wheel axis that is parallel to the substantially common rotational axis of the puller wheels, each paddle wheel being disposed to rotate between an upper region of a unique pair of puller wheels and configured to rearwardly dislodge sugar beets from between the adjacent puller wheels, the paddle wheel assembly being attached to move in unison with the transverse frame, whereby a position of a respective paddle wheel relative to the pinch point for each pair of puller wheels remains constant throughout a range of adjustment of the transverse frame.

15. An apparatus in accordance with claim 11, wherein the plurality of pairs of puller wheels comprises 6 to 12 puller wheel pairs attached at a spacing of 20" to 30" upon the transverse frame.

16. A sugar beet harvester apparatus, comprising:
a wheeled frame, configured to be pulled on ground by a pulling vehicle in a harvesting direction;
a transverse frame, pivotally attached to the wheeled frame and oriented generally perpendicular to the harvesting direction;
a plurality of longitudinal support members, extending rearwardly in a trailing orientation from the transverse frame;
a plurality of pairs of generally upright, spaced apart, symmetrically non-parallel puller wheels having a substantially common rotational axis, configured to contact the ground, each pair being attached to a distal end of one of the longitudinal support members and having a pinch point therebetween; and
a paddle wheel assembly, attached to the transverse frame, including a plurality of paddle wheels that are rotatable about a paddle wheel axis that is parallel to the substantially common rotational axis of the puller wheels, each paddle wheel being disposed to rotate between an upper region of a unique pair of adjacent puller wheels and configured to rearwardly dislodge sugar beets from between the adjacent puller wheels;
the transverse frame being pivotally attached to the wheeled frame with a pivot axis that is substantially aligned with the substantially common rotational axis, whereby rotation of the transverse frame collectively rotates the paddle wheel assembly and all of the pairs of puller wheels about the common rotational axis, thereby adjusting a vertical and longitudinal location of all of the pinch points with respect to the harvesting direction.

17. An apparatus in accordance with claim 16, further comprising:
a hydraulic pivoting mechanism, configured for pivoting the transverse frame to a selected rotated position; and
a control device, associated with the pulling vehicle, configured for controlling the pivoting mechanism.

18. An apparatus in accordance with claim 16, wherein the transverse frame and the pinch point are angularly adjustable through an arc of about 20 degrees, and the pinch point is longitudinally adjustable by a distance of at least 3 inches, measured along the ground.

19. An apparatus in accordance with claim 16, wherein the plurality of pairs of puller wheels comprises 6 to 12 puller wheel pairs attached to 6 to 12 respective longitudinal support members at a spacing of 20" to 30" upon the transverse frame.

* * * * *